March 12, 1968 G. SCHAGER 3,373,249

MAGNETIC ERASING HEAD

Filed March 3, 1964 2 Sheets-Sheet 1

INVENTOR.
GEROLD SCHAGER
BY
Frank R. Jifari
AGENT

March 12, 1968 G. SCHAGER 3,373,249

MAGNETIC ERASING HEAD

Filed March 3, 1964 2 Sheets-Sheet 2

INVENTOR.
GEROLD SCHAGER
BY
Frank R. Jifani
AGENT 3,373,249

MAGNETIC ERASING HEAD

Gerold Schager, Vienna, Austria, assignor to North American Philips Company, Inc., New York, N.Y., a corporation of Delaware Filed Mar. 3, 1964, Ser. No. 348,945
Claims priority, application Austria, Mar. 6, 1963, A 1,751/63
5 Claims. (Cl. 179—100.2)

ABSTRACT OF THE DISCLOSURE

A magnetic core structure for an erasing head which will have a minimal stray field is built of two core parts separated by a gap and having one side of the parts bounding the gap in coplanar relationship, while one of the other sides of the parts bounding the gap projects from the gap boundary surface with respect to the remaining side.

In magnetic recording and/or play-back devices it is often necessary to erase one of two tracks located closely side by side on the record carrier, without modifying the information stored in the other track. This requirement is difficult to satisfy since erasing heads operate with a considerably greater field strength relative to recording and play-back heads. Consequently the stray fields emerging laterally from the gap of an erasing head are strong and may erase, at least in part, adjacent tracks if not spaced sufficiently from the track to be erased. This will apply to heads of the type having a single magnetic circuit, for instance, heads for erasing sound or synchronisation tracks which extend next to the track carrying the principal information as well as to heads having a plurality of magnetic circuits, for example erasing heads in double-track recorders.

To fulfill the above-mentioned requirement, the present invention provides an erasing head of a very simple construction wherein the stray field emerging at one side of the gap is weaker than at the other side and hence the spacing between the track to be erased and an adjacent track can be smaller at the side of the weaker stray field. Such an erasing head according to the invention comprises a substantially annular magnetic circuit built up of at least two parts of a core. At one side of the gap, the surfaces of the core parts of the magnetic circuit which laterally adjoin the boundary surfaces of the gap are coplanar and at right angles to the said boundary surfaces and at the other side of the gap, the surface of one part of the core containing the boundary surface of the gap projects from the gap boundary surface of the other part of the core.

In one embodiment of the invention, in arranging the parts of the core in one plane, the gap boundary surfaces are formed by end surfaces of core parts with different widths.

For a compact arrangement it is advantageous if at least one gap boundary surface is formed by a side face of one part of the core. In such a structure of an erasing head it is also advantageous if the two parts of the core are arranged in different planes so that two identical halves of the core can be used. A magnetic circuit having the above-mentioned features may furthermore advantageously be combined with a second similar magnetic circuit to form an erasing head having a double track.

In order that the invention may be readily carried into effect, it will now be described in detail, by way of example, with reference to a few embodiments shown in the accompanying diagrammatic drawing without, however, being limited thereto.

Figure 1:
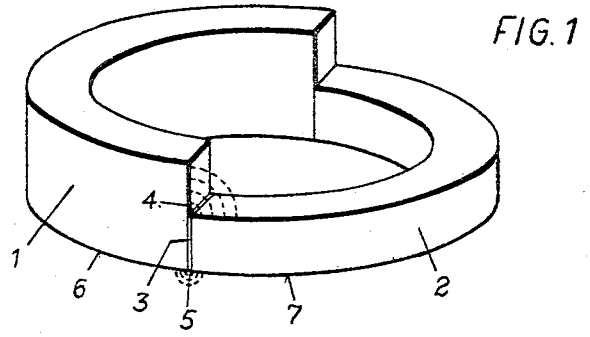
FIGS. 1 to 5 show the shape and the arrangement of core halves for an erasing head according to the invention, but in which the energizing coils and the remaining components necessary for building up such a head are omitted.

The two parts of the core constituting the magnetic circuit of the erasing head are indicated by 1 and 2 in FIGURE 1. A gap spacer 3 for forming the useful gap is provided between the two core parts 1 and 2. The The energizing coil, together with the remaining components for building up such an erasing head, as the core holder, casing, etc., are omitted for the sake of clarity.

As can be seen from FIGURE 1, the two parts of the core have different thicknesses, so that a step is formed at one side 4 of the gap 3 due to the surface of the core part 1 which contains the boundary surface of the gap projecting from the gap boundary surface of the core part 2. At the other side 5 of the gap 3, operating surfaces 6, 7 of the core parts 1, 2, which laterally adjoin the gap boundary surfaces, are situated at right angles to the latter and in one plane. When considering in such an erasing head the variation of the lines of the stray fields occurring at the two sides 4 and 5 of the gap 3 it will be seen that the lines of force at the side 4 of the gap considerably exceed those at the side 5 since they have a shorter air-path and hence a lower magnetic reluctance at the first-mentioned side. The variation of said stray lines is indicated by broken lines in FIGURE 1. As compared with the known erasing head, in which the two parts of the core have the same thickness and hence the stray fields are the same at each side of the gap, the arrangement and design of the core parts according to the invention provide different stray fields. Consequently, at the side 5 of the gap of the erasing head according to the invention, the adjacent track can be passed along at a considerably smaller distance than in an ordinary erasing head. As previously mentioned, such a structure of the head is thus very suitable for erasing a track which extends closely next to another without influencing any information stored in this adjacent track.

Figures 2, 3:
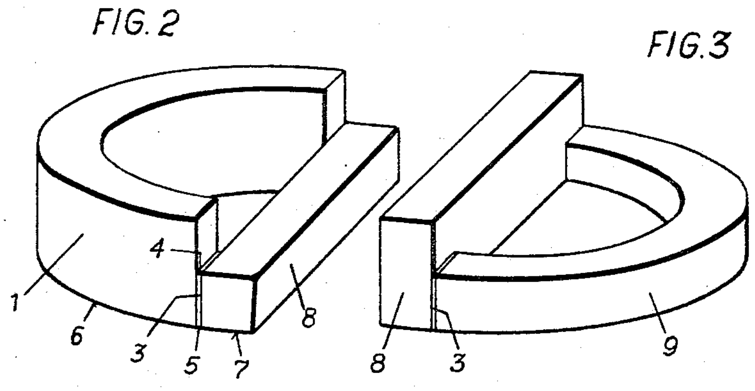

Instead of bounding the gap by end surfaces of the core parts, the gap may alternatively be bounded by the side face of at least one part of the core. Thus, for example, as shown in FIGURE 2, a core part 8 which co-acts with the core part 1 is made quadrangular and hence one side face thereof bounds the gap 3. The step at the side 4 of the gap is formed, as before, due to the core part 1 being thicker than the quadrangular part 8. As a matter of fact, the quadrangular part 8 may be thicker than an annular core part 9, as shown in FIGURE 3.

Figure 4:
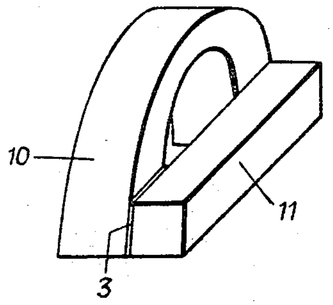

FIGURE 4 shows an arrangement in which the gap 3 is bounded by side faces of core parts 10 and 11 respectively. The energizing coil may of course be arranged on the quadrangular part or on the annular part, the available space then being used differently.

Figure 5:
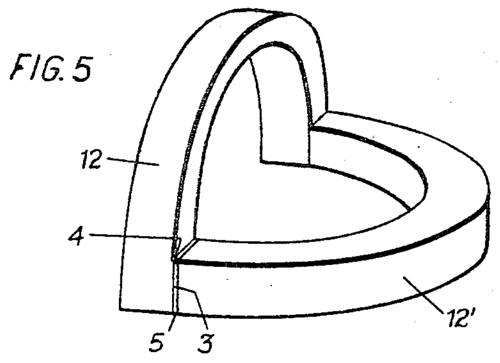
Figure 6:
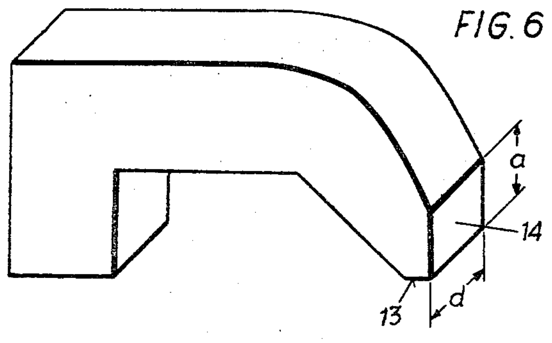
FIG. 6 shows the shape of a core half known per se which can be used with particular advantage.

FIGURE 5 shows a very suitable device which utilises two identical core parts 12, 12' for forming the magnetic circuit. Use is preferably made of core parts known per se, for example of the kind shown in FIGURE 6. In this example a so-called tooth core is concerned, end surfaces 13 of which form the gap boundary surfaces in conventional heads and of which surfaces 14 are converted into the desired running surface after grinding the head. When two such core halves are united to form an erasing head as shown in FIGURE 5 it is advantageous to give the surfaces 14 special dimensions, that is to say the dimension *a* must be at least equal to the thickness *d*. It is thus achieved that on uniting the core halves a uniform flat surface containing the gap is formed which extends over the two halves of the core and which is changed to a running surface by grinding the head. This is very advantageous for the grinding process in order to obtain the running surface for the erasing head since the material of the core is evenly ground from both halves. In fact, if the core parts were arcuate in the region of the surface 14, as shown in FIGURE 5, or if the dimension *a* were smaller than *d*, then on uniting the core halves into a device as shown in FIGURE 5, the core half 12 whose end surface bounds the gap would project beyond the other core half 12′ with the angle present at the side 4 of the gap. During the grinding process for forming the running surface, such projecting parts could give rise to faulty heads since, if the core parts are manufactured, for example, from ferrite material, this material could crumble off at the projecting areas. However, no faults can occur at the gap if a uniform surface is avaliable for grinding. Such considerations also apply of course to a head designed as shown in FIGURE 4.

Figure 7:
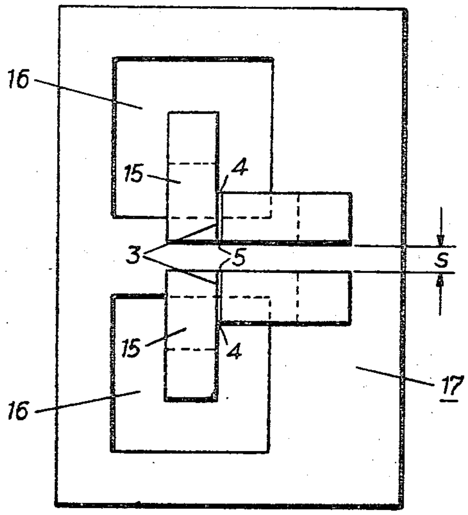
FIG. 7 is an elevational view of a double-track erasing head, as viewed in the direction of the running surfaces thereof.

FIGURE 7 is an elevational view of a double-track erasing head, as viewed in a direction towards the running surface thereof. Such a double-track erasing head is built up of two head assemblies as shown in FIGURE 5, which are relatively arranged as mirror images with respect to a surface extending between the two gaps and at right angles thereto. Each of the core parts 15, the side faces of which constitute the gap boundary surfaces, carries an energizing coil 16. Since the two magnetic circuits are adjacent each other at the gap sides 5 where the smaller stray field emerges, an extremely small distance *s* between the two magnetic circuits is permissible without erasing parts of one track, when the other should be erased. The reference numeral 17 indicates a housing or the like which accommodates the magnetic circuits in the usual manner.

What is claimed is:

1. An erasing head comprising a magnetic circuit having two core parts separated by a non-magnetic gap, the operating surfaces of the core parts of the magnetic circuit laterally adjoining the gap boundary surfaces being coplanar and at right angles to said boundary surfaces at one side of the gap and, at the other side of the gap, the surface of one part of the core containing the boundary surface of the gap projecting beyond the gap boundary surface of the other part of the core.

2. An erasing head as claimed in claim 1 wherein the gap boundary surfaces are formed by end surfaces of the core parts having different widths.

3. An erasing head as claimed in claim 1, wherein at least one gap boundary surface is formed by a side face of one part of the core.

4. An erasing head as claimed in claim 3 wherein the two core parts form a substantially annular magnetic circuit.

5. An erasing head as claimed in claim 3 wherein one of the two core parts is linearly quadrangular.

References Cited

UNITED STATES PATENTS

| | | | |
|---|---|---|---|
| 2,230,913 | 2/1941 | Schuller | 179—100.2 |
| 2,747,024 | 5/1956 | Sprosty | 179—100.2 |
| 2,876,294 | 3/1959 | Wissmann | 179—100.2 |

TERRELL W. FEARS, *Primary Examiner.*

A. I. NEUSTADT, *Examiner.*